(12) United States Patent
Johannsen et al.

(10) Patent No.: US 12,116,058 B2
(45) Date of Patent: Oct. 15, 2024

(54) TRACK SHOE ASSEMBLY INCLUDING A SHOE PLATE AND A GROUSER AND RELATED METHOD OF MANUFACTURE

(71) Applicant: Caterpillar Inc., Peoria, IL (US)

(72) Inventors: Eric J. Johannsen, Washington, IL (US); Kevin L. Steiner, Tremont, IL (US); Jason L. Sebright, Chillicothe, IL (US); Donovan S. Clarke, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 17/492,861

(22) Filed: Oct. 4, 2021

(65) Prior Publication Data
US 2023/0105350 A1   Apr. 6, 2023

(51) Int. Cl.
*B62D 55/28* (2006.01)
*B62D 55/21* (2006.01)

(52) U.S. Cl.
CPC ............. *B62D 55/28* (2013.01); *B62D 55/21* (2013.01)

(58) Field of Classification Search
CPC ........ B62D 55/21; B62D 55/26; B62D 55/28; B62D 55/32
See application file for complete search history.

(56) References Cited

U.S. PATENT DOCUMENTS

| | | | |
|---|---|---|---|
| 2,874,005 A | 2/1959 | Engström | |
| 3,071,417 A * | 1/1963 | Militana | B62D 55/28 305/191 |
| 3,089,021 A * | 5/1963 | Hawes | B23K 11/04 219/104 |
| 3,717,387 A | 2/1973 | Cackley et al. | |
| 3,912,338 A | 10/1975 | Toews | |
| 3,972,570 A * | 8/1976 | Massieon | B62D 55/28 305/167 |
| 4,359,248 A | 11/1982 | Kortering | |
| 4,434,642 A | 3/1984 | Rasmussen | |
| 4,448,459 A * | 5/1984 | Kortering | B62D 55/275 305/51 |
| 4,482,193 A | 11/1984 | Boggs et al. | |
| 5,303,992 A | 4/1994 | Grainger | |
| 5,482,365 A * | 1/1996 | Peterson | B62D 55/275 305/201 |

(Continued)

FOREIGN PATENT DOCUMENTS

| | | |
|---|---|---|
| EP | 0091817 | 10/1983 |
| EP | 0858945 | 8/1998 |
| EP | 3235710 | 10/2017 |

OTHER PUBLICATIONS

Written Opinion and International Search Report for Int'l. Patent Appln. No. PCT/US2022/044871, mailed Jan. 31, 2023 (10 pgs).

*Primary Examiner* — S. Joseph Morano
*Assistant Examiner* — Emily G. Castonguay (57) ABSTRACT

In at least one aspect, a track shoe assembly includes a shoe plate having a shoe plate body including at least one shoe plate attachment surface defining a groove extending along a width of the shoe plate body, and a grouser having a grouser body having at least one grouser attachment surface, a cross-sectional shape of the at least one grouser attachment surface being the same as a cross-sectional shape of the groove defined by the at least one shoe plate attachment surface.

30 Claims, 6 Drawing Sheets

(56) References Cited

U.S. PATENT DOCUMENTS

| | | | |
|---|---|---|---|
| 7,066,562 B2* | 6/2006 | Rasmussen | B62D 55/26 |
| | | | 305/201 |
| 7,703,863 B2 | 4/2010 | Koolhiran | |
| 8,764,128 B2 | 7/2014 | Nebergall et al. | |
| 9,004,619 B2 | 4/2015 | Meyer et al. | |
| 9,440,693 B2 | 9/2016 | Liu et al. | |
| 2009/0019783 A1* | 1/2009 | Amano | B23K 35/308 |
| | | | 428/218 |
| 2012/0156520 A1* | 6/2012 | Meyer | C21D 1/18 |
| | | | 219/76.14 |
| 2017/0014940 A1 | 1/2017 | Thorson et al. | |
| 2018/0127036 A1* | 5/2018 | Ohishi | B62D 55/26 |
| 2019/0315418 A1 | 10/2019 | Huels et al. | |

\* cited by examiner

TRACK SHOE ASSEMBLY INCLUDING A SHOE PLATE AND A GROUSER AND RELATED METHOD OF MANUFACTURE

TECHNICAL FIELD

Various embodiments of the present disclosure relate generally to a track shoe assembly, including a shoe plate and a grouser, for track-type vehicles and a related method of manufacture.

BACKGROUND

Track-type machines or vehicles, such as crawler-type tractors, may be used on relatively soft terrain to move materials or equipment across the terrain, while providing relatively even distribution of weight of the vehicle. These machines or vehicles include one or more continuous loops, or track assemblies, formed on opposing sides of a given machine or vehicle. The track assemblies are driven by a driving mechanism, such as a machine engine or other port source, via at least one drive gear or sprocket. The track assemblies include a plurality of links and a plurality of track plates, or track shoe assemblies, mounted on the plurality of links, which are, in turn, mounted to an undercarriage assembly, which may include, for example, the sprocket, at least one idler, a plurality of rollers, and any other component of an undercarriage assembly shown in the art. As the rollers rotate using power output by an engine of the vehicle, the belts rotate, and the track plates are laid on the ground, with a grouser of each track plate extending into the terrain. As the rotational force from the rollers is transmitted to the grousers via the belts and the track shoe assemblies, the vehicle advances, or crawls, forward.

Some track shoe assemblies are currently manufactured by rolling a material into 10-meter sections, to a thickness of about 13 mm, and cutting the rolled material to size. That is, the overall width of the track shoe assembly is 10-meters, and each track shoe assembly is cut to predetermined height, depending on the size needed. The relatively large size of the rolled sections makes manufacture of track shoe assemblies, and, therefore, grousers, difficult, in part because it limits the locations in which manufacturing can be performed, due to the limited number of facilities capable of rolling materials in such large sizes. As a result of the limited number of facilities and difficulties in working with such large pieces of material, the manufacture of track shoe assemblies may be relatively expensive. There is a need, however, for a track shoe assembly for which manufacturing and assembly can be performed in a more places and with relatively lower manufacturing costs.

In addition, over time, and with use, a grouser of a track shoe assembly may crack due to forces from the terrain, as the grouser extends into the terrain and sustains a normal force from same. Cracks in the grouser may occur at an edge or corner between proximal and distal surfaces of the grouser and an outer planar surface of a shoe plate of the track shoe assembly. In addition, an outer surface of the grouser, as well as the proximal and distal surfaces of the grouser, may be worn down, and in some cases, may be worn down in an uneven manner, such that end portions of the grouser may have worn down to a greater degree as compared to a central portion of the grouser. With reference to the axes and planes shown in FIGS. 2 and 3 of this application, currently available track shoe assemblies have a maximum ratio of a cross-sectional area of a grouser, with respect to an X-Z plane, to a length of a shoe plate, as measured along an X-axis, of about 205 mm. Even with this ratio being at the maximum value of 205 mm, there are certain applications where the wear life of the shoe grouser is shorter than the wear life of the other track components, especially the links. In addition, currently available track shoe assemblies, including integrally formed grousers and shoe plates or assembled grousers and shoe plates, are typically formed of the same materials.

Grouser bars, also referred to grouser shoes, may be attached to a worn grouser, as described in U.S. Pat. No. 4,434,642, to Rasmussen, for example. Specifically, the Rasmussen patent describes a replacement grouser bar that can be fitted over a worn grouser bar, and welded to the worn grouser bar using a reverse forging method. The device and method described in the Rasmussen patent may, however, also experience problems with cracking at a joint between the worn grouser and the replacement grouser bar, due to the normal forces from terrain with the track shoe assembly is used. In addition, the replacement grouser bar is also subject to the same uneven wear as the original grouser, and at that point, it is likely that the entire track shoe assembly will need to be replaced with a new track shoe assembly.

The track shoe assembly and related method of manufacture of the present disclosure are directed to overcoming one or more of these above-referenced challenges, or other problems in the art.

SUMMARY OF THE DISCLOSURE

In one aspect, a track shoe assembly may include a shoe plate having a shoe plate body including at least one shoe plate attachment surface defining a groove extending along a width of the shoe plate body, and a grouser having a grouser body having at least one grouser attachment surface, a cross-sectional shape of the at least one grouser attachment surface being the same as a cross-sectional shape of the groove defined by the at least one shoe plate attachment surface.

In another aspect, a track shoe assembly may include a shoe plate having a shoe plate body including at least one shoe plate attachment surface extending along a width of the shoe plate body, and a grouser having a grouser body having at least one grouser attachment surface configured to be attached to the shoe plate attachment surface, wherein a ratio of a cross-sectional area of an end surface of the grouser body to a length of the shoe plate body is in the range of 25 mm to 210 mm.

In yet another aspect, a method of manufacturing a track shoe assembly may include forming a shoe plate having a shoe plate body including at least one shoe plate attachment surface extending along a width of the shoe plate body, forming having a grouser body having at least one grouser attachment surface configured to be attached to the shoe plate attachment surface, wherein a ratio of a cross-sectional area of an end surface of the grouser body to a length of the shoe plate body is in the range of 25 mm to 210 mm, and attaching the grouser to the shoe plate to form the track shoe assembly.

In still another aspect, a track shoe assembly may include a shoe plate having a shoe plate body including at least one shoe plate attachment surface extending along a width of the shoe plate body, the shoe plate body being formed of a shoe plate material, and a grouser having a grouser body having at least one grouser attachment surface, the grouser body being formed of a grouser material, and the grouser material being different than the shoe plate material.

In yet another aspect, a track shoe assembly may include a shoe plate having a shoe plate body including at least one shoe plate attachment surface extending along a width of the shoe plate body, the shoe plate body being formed of a shoe plate material, and a grouser having a grouser body having at least one grouser attachment surface, configured to be attached to the at least one shoe plate attachment surface, the grouser body being formed of a grouser material, wherein a hardness of the grouser material is greater than a hardness of the shoe plate material.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprising," "having," including," and any variations thereof, are intended to cover a non-exclusive inclusion, such that a process, method, article, or apparatus that comprises a list of elements does not include only those elements, but may include other elements not expressly listed or inherent to such a process, method, article, or apparatus. In addition, in this disclosure, relative terms, such as, for example, "about," "generally," "substantially," and "approximately" are used to indicate a possible variation of ±10% in the stated value. Further, in this disclosure, references to widths, depths, and lengths provided with respect to various portions and/or surfaces are consistent, i.e., all widths are defined along a Y-axis, all depths are defined along a Z-axis, and all lengths are defined along an X-axis.

Figure 1A:
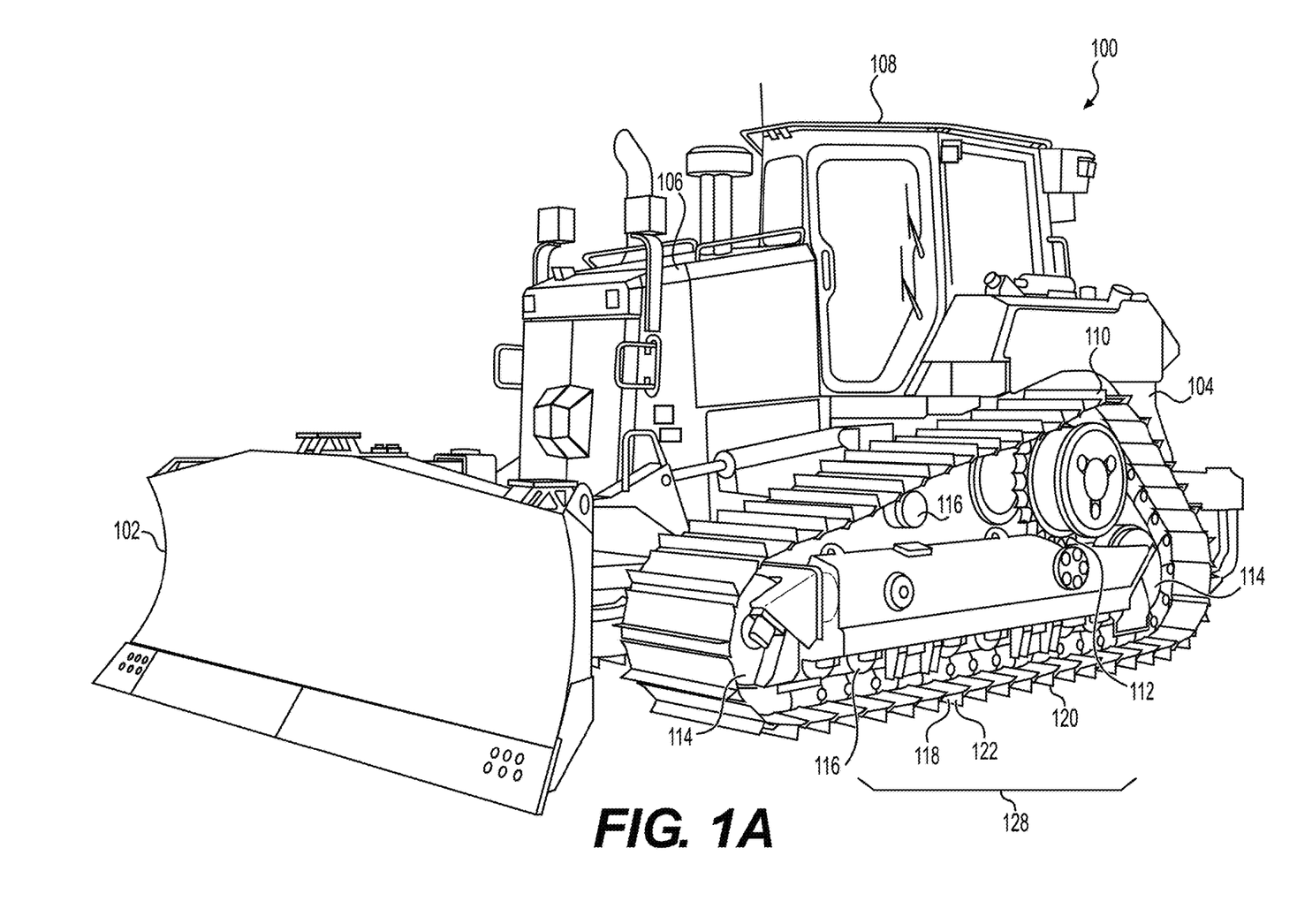
FIG. 1A depicts a schematic view of an exemplary track-type vehicle on which track shoe assemblies, formed in accordance with the embodiments of a track shoe assembly described herein, are installed.
Figure 1B:
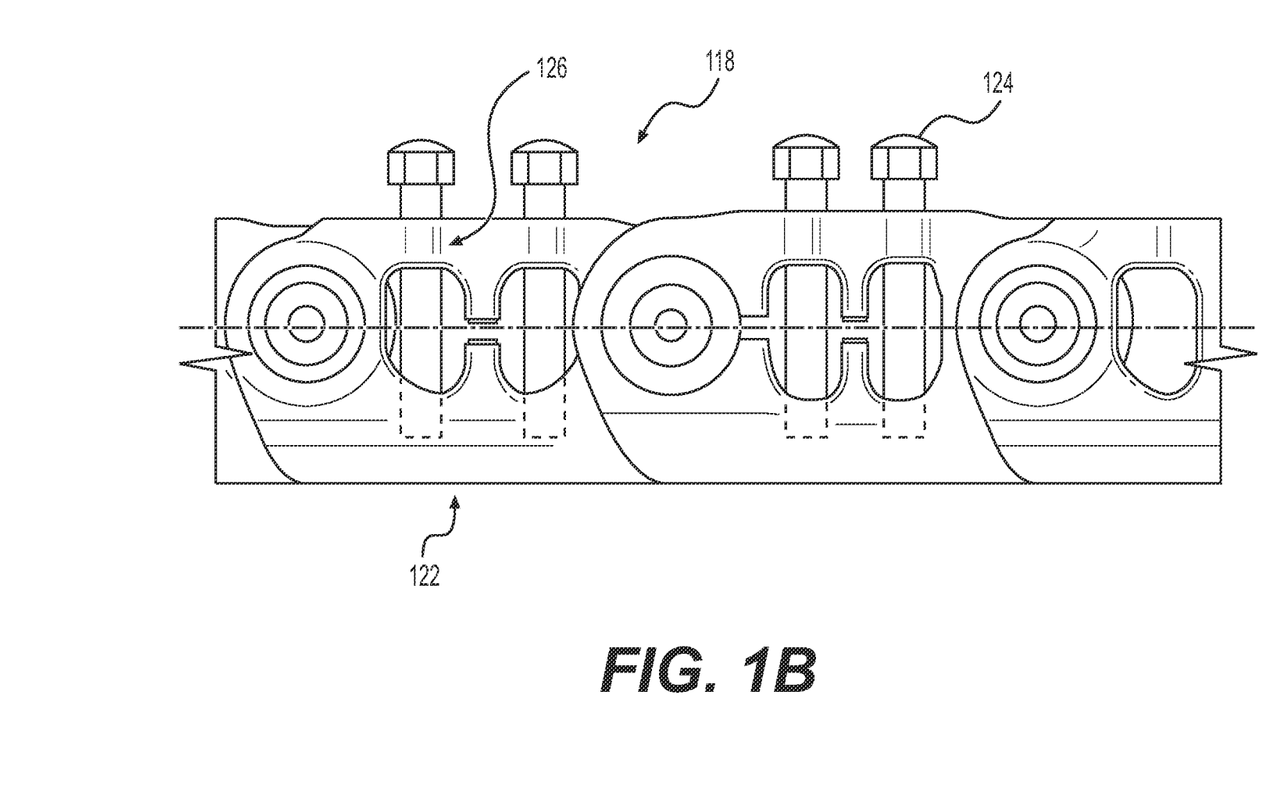
FIG. 1B depicts a schematic detail view of portions of a track chain assembly, as shown in FIG. 1A, in accordance with the embodiments of a track chain assembly described herein.

FIG. 1A shows a schematic view of a track-type machine or vehicle 100, specifically, as an example, a track-type tractor, with a blade 102 for moving ground materials, such as soil, stone, debris, etc. The vehicle 100 includes a chassis 104 on which an engine housing 106, containing a machine engine and other components necessary for operation of the vehicle 100, and an operator station 108, in which an operator of the vehicle 100 can perform control and operation of the vehicle 100, are mounted. The vehicle 100 includes one or more track assemblies 110, with the exemplary vehicle 100 of FIG. 1A including two track assemblies 110 (one track on either side of the chassis 104). Each track assembly 110 includes a drive gear or sprocket 112, idlers 114, and rollers 116 that rotate via power output by the engine. The sprocket 112 transmits the power from the engine to the rollers 116. A track chain 118 is mounted around the rollers 116, and a plurality of track shoe assemblies 120 are mounted to the track chain 118. The track chain 118 includes a plurality of track links 122 and a plurality of pins 124. The plurality of track links 122 may be coupled together to form an endless loop, as shown in FIG. 1A. Each link 122 includes pin holes 126, shown in FIG. 1B, which are configured to receive one of the plurality of pins 124, to thereby attach the link 122 to one of the plurality of track shoe assemblies 120, As discussed below with reference to FIG. 2, each track shoe assembly 120 may include one or more through holes 242, which are also configured to receive one of the plurality of pins 124, for attachment to the plurality of links 122. The track chain 118 and the track shoe assemblies mounted thereto may collectively be referred to as a track chain assembly 128, shown in FIG. 1A.

Figure 2:
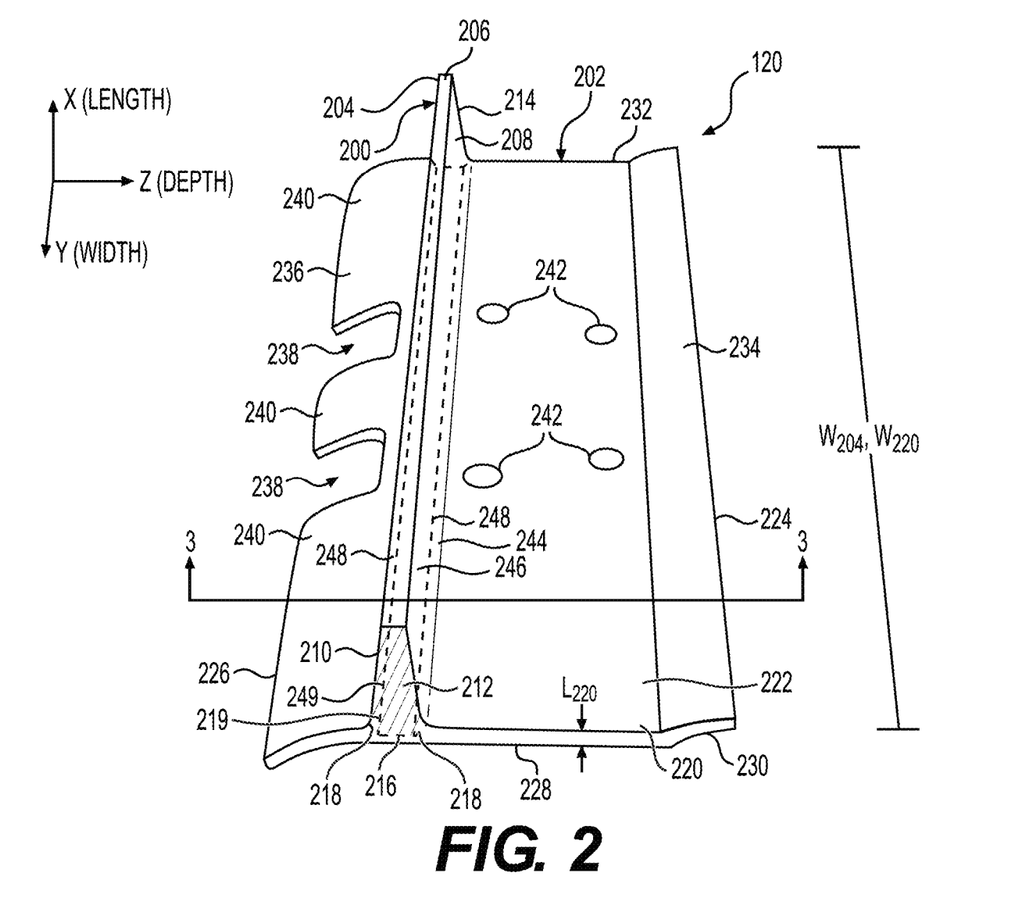
FIG. 2 depicts a schematic view of a grouser and a shoe plate of a track shoe assembly, according to one or more embodiments.

FIG. 2 shows a track shoe assembly 120, including a grouser 200 and a shoe plate 202, according to one or more embodiments. The grouser 200 has a grouser body 204 formed generally as a trapezoidal prism, although the shape of the grouser body 204 is not limited to this shape. The grouser body 204 has a plurality of surfaces, including at least a distal surface 206, configured to contact terrain as the vehicle 100 moves, a front surface 208, a back surface 210, an end surface 212, and another end surface 214. The grouser body 204 also includes a plurality of attachment surfaces, including a planar surface 216, and one or more angled surfaces 218 adjacent to the planar surface 216. The angled surfaces 218 of the attachment surfaces of the grouser body 204 may be at an angle θ relative to the planar surface 216. The planar surface 216 is parallel to the distal surface 206. An edge 219 between the planar surface 216 and each of the angled surfaces 218, shown in FIGS. 2 and 3, may be a chamfered edge or a rounded edge. In an alternative embodiment, the grouser body 204 may include an arcuate or curved attachment surface, such as the curved surface shown in FIG. 4, and described below.

The front surface 208 and the back surface 210 are on intersecting planes, while the end surface 212 and the other end surface 214 are opposite to each other. Put another way, the distal surface 206 and the planar surface 216 are parallel to each other and to a Z-Y plane, and the end surface 212 and the other end surface 214 are parallel to each other and to an X-Z plane. In addition, the end surface 212 and the other end surface 214 have a trapezoid shape, though the shape of these surfaces is not limited to a trapezoid, and may be any polygon or a shape having one or more curved, curvilinear, and/or flat edges.

With reference to FIG. 2, the grouser body 204 may have an overall width $W_{204}$, as measured along the Y-axis, of about 300 mm to about 1000 mm, inclusive. And with reference to FIG. 3, the grouser body 204 may have an overall depth $D_{204}$, as measured along the Z-axis, of about 19 mm to about 57 mm, inclusive, and an overall length $L_{204}$, measured along the X-axis, of about 15 mm to about 112 mm, inclusive. The ranges of widths, depths, and lengths of the grouser body 204 may vary from the ranges of values listed above.

As shown in FIG. 2, the shoe plate 202 of the track shoe assembly 120 has a shoe plate body 220 formed generally as a rectangular prism, although the shape of the shoe plate body 220 is not limited to this shape. The shoe plate body 220 has a plurality of surfaces, including at least a distal surface 222, a front surface 224, a back surface 226, a proximal surface 228, an end surface 230, and another end surface 232. The distal surface 222 and the proximal surface 228 are opposite to each other, and the end surface 230 and the other end surface 232 are opposite to each other. Put another way, with reference to the axes identified in FIG. 2, the distal surface 222 and the proximal surface 228 are parallel to each other and to a Z-Y plane and the end surface 230 and the other end surface 232 are parallel to each other and to an X-Z plane.

The shoe plate body 220 may also include one curved portion 234 adjacent to the front surface 224, and another curved portion 236 adjacent to the back surface 226. The curved portions 234 and 236 are defined by curves on the distal surface 222 and the proximal surface 228, respectively, as shown in FIG. 2. The front surface 224 and the back surface 226 are not parallel to each other in the embodiment shown in FIG. 2, as they are ends of the curved portions 234 and 236. The other curved portion 236, adjacent to the back surface 226, may also have at least one recess 238, defined by at least two tabs 240. In the embodiment shown in FIG. 2, the curved portion 236 includes two recesses 238, defined by three tabs 240, although the shoe plate body 220 may have a greater or lesser number of recesses 238 and tabs 240. The shoe plate body 220 may also include one or more through holes 242 that extend through the distal surface 222 and the proximal surface 228, as shown in FIG. 2. In the embodiment shown in FIG. 2, four through holes 242 are provided, although the shoe plate body 220 may have a greater or lesser number of through holes 242. The through holes 242 may be used, for example, to attach the track shoe assembly 120 to the track chain 118 to form the track assembly 110. The shoe plate body 220 is not limited to the shape shown in FIG. 2, however, and the distal surface 222 and the proximal surface 228 may be flat surfaces or straight edges, and, in such an alternative embodiment, the back surface 226 may be opposite to the front surface 224 and both may be parallel to the X-Y plane.

Figure 3:
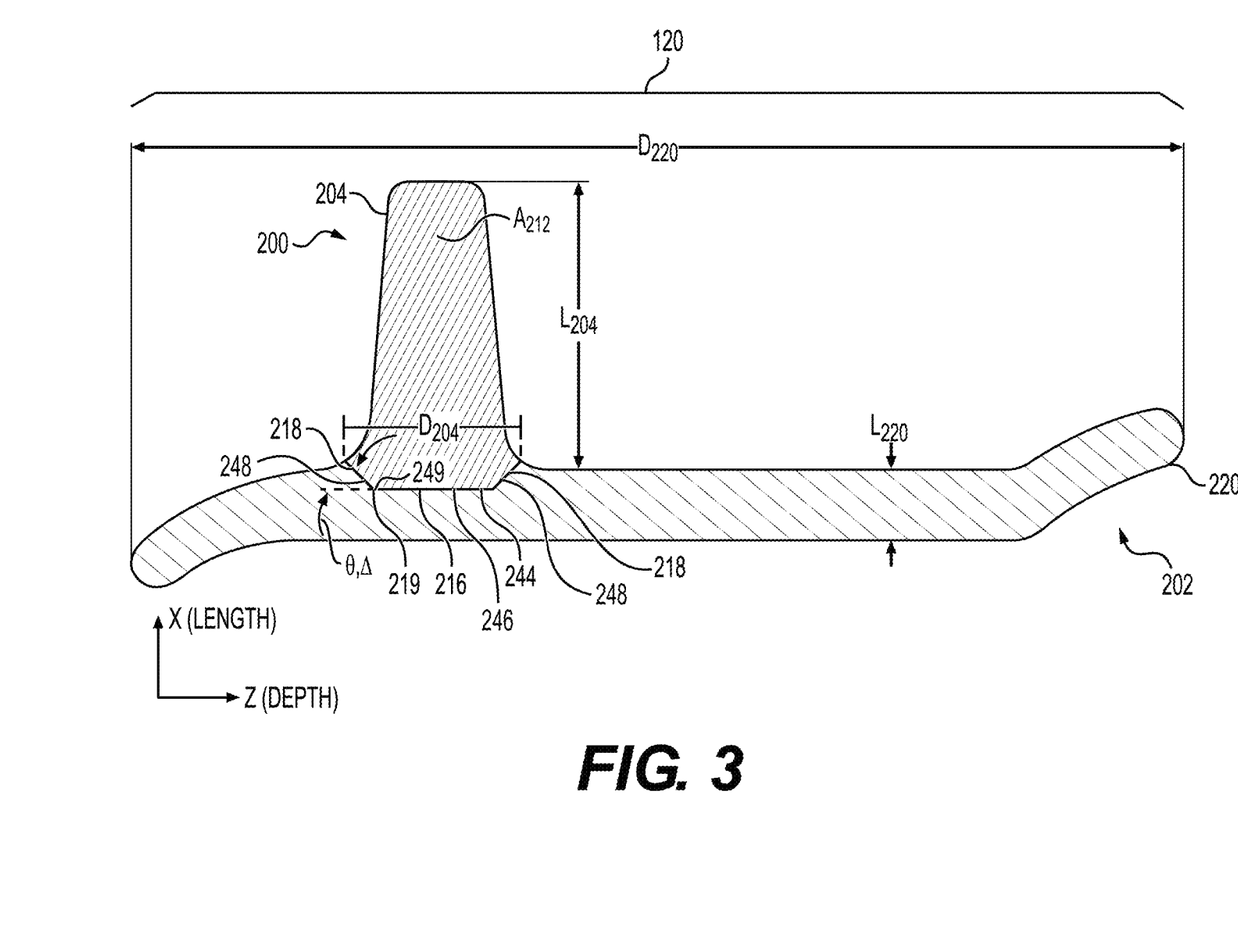
FIG. 3 depicts a cross-sectional side view of a grouser and a shoe plate of the track shoe assembly shown in FIG. 2, taken along section line 3-3.

The shoe plate body 220 may also include a groove 244, shown in FIGS. 2 and 3, as a recess within the distal surface 222, and defined by a plurality of attachment surfaces of the shoe plate body 220, including a planar surface 246, and at least two angled surfaces 248. The angled surfaces 248 of the attachment surfaces of the shoe plate body 220 may be at an angle Δ relative to the planar surface 246. The planar surface 246 is parallel to the distal surface 222. An edge 249 between the planar surface 246 and each of the angled surfaces 248 may be a chamfered edge or a rounded edge.

With reference to FIG. 2, the shoe plate body 220 may have an overall width $W_{220}$, as measured along the Y-axis, of about 300 mm to about 1000 mm, inclusive. In addition, with reference to FIG. 3, the shoe plate body 220 may have an overall depth $D_{220}$, as measured along the Z-axis, of about 165 mm to about 370 mm, inclusive, and an overall length $L_{220}$, as measured along the X-axis, of about 8 mm to about 28 mm, inclusive. The ranges of widths, depths, and lengths of the shoe plate body 220 may vary from the ranges of values listed above.

The dimensions of the attachment surfaces of the grouser body 204 and the dimensions of the attachment surfaces of the groove 244 of the shoe plate body 220 may be approximately equal to each other. More specifically, a width and a depth of the planar surface 216 of the grouser body 204 may be approximately equal to a width and a depth of the planar surface 246 of the shoe plate body 220. In addition, a width and a measured distance within an X-Z plane of the angled surfaces 218 of the grouser body 204 may be approximately equal to the corresponding dimensions of the angled surfaces 248 of the shoe plate body 220. By virtue of the approximately equal dimensions of these attachment surfaces, welding, including, in particular, linear friction welding can be performed to attach the grouser body 204 to the shoe plate body 220 at the attachment surfaces.

In an alternative embodiment, the plurality of attachment surfaces of the grouser body 204 may form a groove within the grouser body 204, and the plurality of attachments surfaces of the shoe plate body 220 may form a protrusion, instead of the groove 244 shown in FIG. 2. In all other respects, the grouser body 204 and the shoe plate body 220 of the alternative embodiment may be the same as those of the embodiment shown in FIG. 2.

With reference to FIG. 3, which depicts a cross-sectional view of the grouser 200 and the shoe plate 202 of the track shoe assembly 120, taken along section line 3-3, a ratio of a cross-sectional area $A_{212}$ of the end surface 212 of the grouser body 204 to the length $L_{220}$ of the shoe plate body 220 (that is, a length of the end surface 230 of the shoe plate body 220, as measured along the X-axis, and as shown in FIG. 3) may be in a range of 25 mm to 205 mm, or, alternatively, greater than 205 mm. And, in particular, the ratio may be approximately 210 mm. Put another way, the ratio may be in the range of 25 mm to 210 mm.

A material used to form the grouser 200 may be the same or different than a material used to form the shoe plate 202. In the embodiment in which the materials used to form the grouser 200 and the shoe plate 202 are the same material, the material may have different hardnesses, such that a hardness of the material that forms the grouser 200 is greater than a hardness of the material that forms the shoe plate 202, as measured by Rockwell hardness (RKW). Alternatively, in the embodiment in which the materials used to form the grouser 200 and the shoe plate 202 are different, as depicted in FIG. 3, the material used to formed the grouser 200 may have a greater hardness than that of the material used to form the shoe plate 202, as measured by RKW. In either embodiment, a hardness of the material that forms the grouser 200 may be in the range of RKW C45 to RKW C55, and a hardness of the material that forms the shoe plate 202 may be in the range of RKW C35 to RKW45. In the embodiment in which the materials are different, the grouser 200 may be formed of a white iron, and the shoe plate 202 may be formed of a plain steel. Alternatively, one of the materials may be air hardened steel, such as the material discussed in U.S. Pat. No. 9,440,693 to Liu et al. The materials used to form the grouser 200 and the shoe plate 202 are not, however, limited to the above-noted materials, and other materials may be used.

The grouser 200 and the shoe plate 202 are configured to be securely attached to each other by welding, for example, as discussed in more detail with reference to FIG. 5, below. Alternatively, the grouser 200 and the shoe plate 202 may be securely attached to each other by brazing. In a case in which welding is used, in particular, with reference to the embodiment shown in FIGS. 2 and 3, as an example, the attachment surfaces of the grouser body 204, including the planar surface 216 and the angled surfaces 218, are configured to contact and be welded to the attachment surfaces of the shoe plate body 220, including the planar surface 246 and the angled surfaces 248. And, in the embodiment in which a groove is formed on the grouser body 204 and a protrusion is formed on the shoe plate body 220, the attachment surfaces of the grouser body 204 are contacted and welded to attachment surfaces of the shoe plate body 220. Friction welding, and more specifically, linear friction welding, may be used to attach the grouser body 204 to the shoe plate body 220. Alternatively, arc welding, including metal inert gas (MIG) arc welding, tungsten inert gas (TIG) welding, and shielded metal arc welding (SMAW), may be used. When the grouser body 204 and the shoe plate body 220 are attached to each other, the planar surface 216 of the grouser body 204 is welded to the planar surface 246 of the shoe plate body 220, and the angled surfaces 218 of the grouser body 204 are welded to the angled surfaces 248 of the shoe plate body 220. Alternatively, contact and/or welding may be made between a subset of these surfaces.

Figure 4:
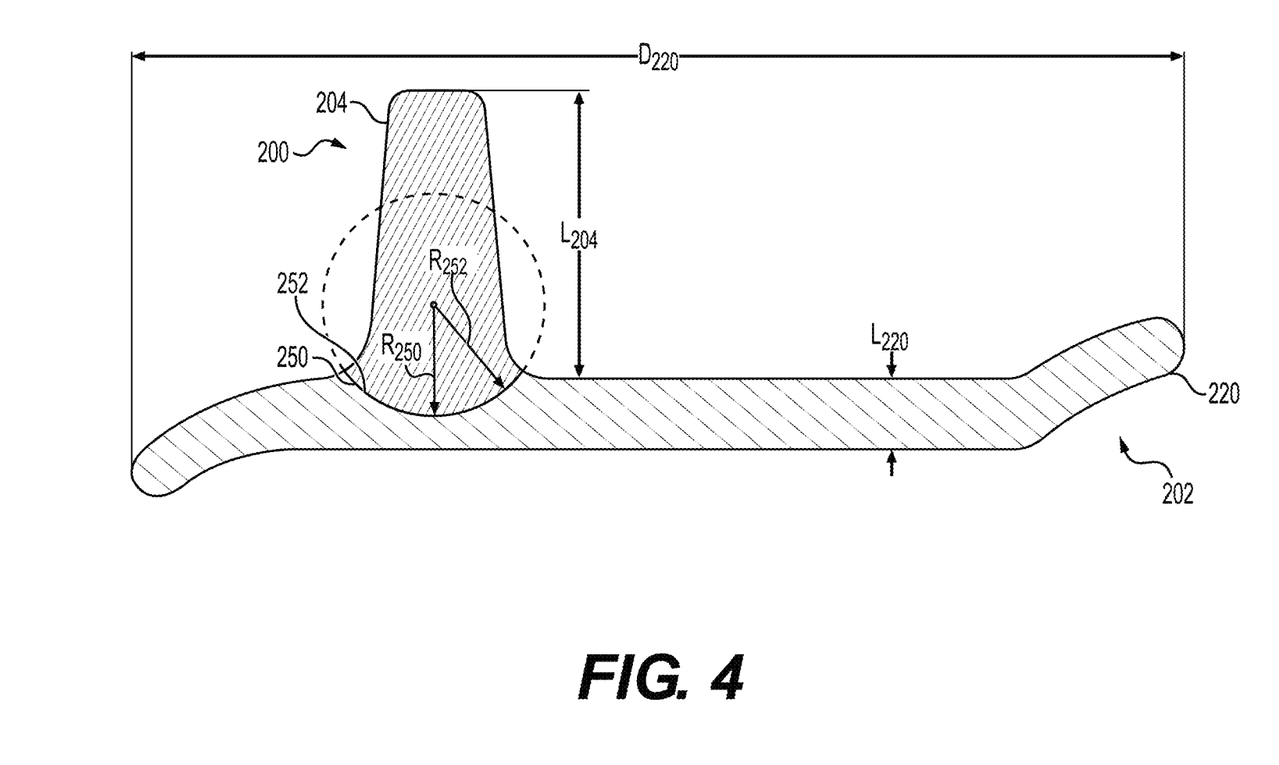
FIG. 4 depicts a cross-sectional side view of a grouser and a shoe plate of a track shoe assembly according to an alternative embodiment.

With reference to FIG. 4, in an alternative embodiment, the grouser body 204 may include a curved attachment surface 250, having a radius of curvature $R_{250}$ that is defined, at least in part, based on a length, a width, or a height of the grouser body 204. The shoe plate body 220 may also have a corresponding curved attachment surface 252 having a radius of curvature $R_{252}$ that is approximately equal to or greater than the radius of curvature $R_{250}$ of the curved attachment surface 250 of the grouser body 204. In this embodiment, when the grouser body 204 and the shoe plate body 220 are attached to each other, the entirety of the curved attachment surface 250 of the grouser body 204 is welded to the entirety of the curved attachment surface 252 of the shoe plate body 220. Alternatively, contact and/or welding may be made between portions of these surfaces.

The grouser 200 extends outward from the distal surface 222 of the shoe plate body 220, so that, when the track shoe assembly 120 is mounted on the track chain 118 of the track assembly 110, shown in FIG. 1A, the grouser 200 extends in a direction that is normal to a plane of the track chain 118 at the point on the track chain 118 where the track shoe assembly 120 is attached. That is, the grouser 200 extends outward from the track chain 118 at all positions along the track chain 118 on which a track shoe assembly 120 is installed.

INDUSTRIAL APPLICABILITY

The grouser 200 and shoe plate 202 of the present disclosure can provide for a relatively stronger and longer-lasting (that is, a longer use life) track shoe assembly 120 of a track assembly 110 of a track-type vehicle 100, such as the track-type tractor shown in FIG. 1A. Specifically, because the grouser 200 can be formed of a material having a greater hardness as compared to a material which forms the shoe plate 202, the track shoe assembly 120 of the present disclosure may have a longer use life and be less susceptible to cracking. In addition, because of the relative dimensions, and in particular, the ratio of the cross-sectional area $A_{212}$ of the end surface 212 of the grouser body 204 to a length $L_{220}$ of the shoe plate body 220 being greater than 205 mm, and because of the configuration of the attachment surfaces of the grouser 200 and the shoe plate 202, respectively, an assembled track shoe assembly 120 having a relatively longer use life, a higher strength of the grouser and the welded connection between the grouser 200 and the shoe plate 202, and a track shoe assembly 120 that is less susceptible to cracking can be provided. In addition, because the grouser 200 and the shoe plate 202 can be separately formed, and subsequently joined using by welding or brazing the attachment surfaces, to form a secure connection between the grouser 200 and the shoe plate 202, manufacture and distribution costs associated with the track shoe assembly 120 may be relatively low, where the separate components can be formed in a greater number of facilities without requiring large equipment. And, as a result, the costs associated with manufacture and distribution of grouser 200 and shoe plates 202, either as separate components or as assembled track shoe assemblies 120, formed in accordance with the invention, may be relatively lower, due to reduced distance and time of transit.

Figure 5:
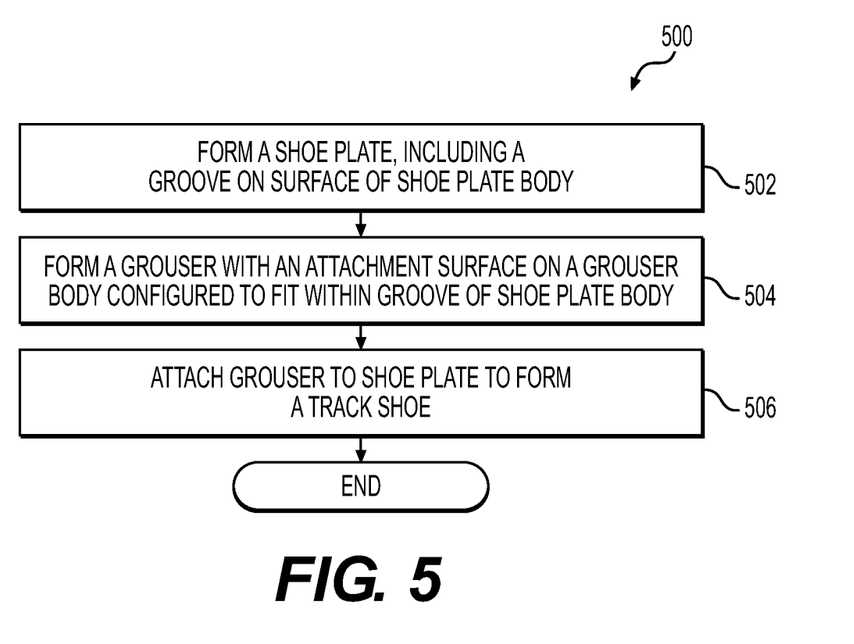
FIG. 5 is a flowchart of a method of forming a track shoe assembly, according to one or more embodiments.

FIG. 5 depicts a flowchart of a method 500 of forming a track shoe assembly, such as the track shoe assembly 120 shown in FIGS. 1 to 3, according to one or more embodiments. The method 500 may include, for example, a step 502 of forming a shoe plate 202 having a shoe plate body 230 including a groove 244 on a distal surface 222 of the shoe plate body 220. The shoe plate body 220 and the groove 244 may be formed in accordance with the foregoing description of the shoe plate body 220 and the groove 244, as shown in FIGS. 2 and 3. In particular, for example, the shoe plate body 220 may be rolled of a material, such as a low alloy steel hardened in the RKW C37 to RKW C45 range. Then, the groove 244 may be formed by removing material from the rolled shoe plate body 220. Forming of the groove 244 includes removing the material to form the planar surface 246 and the angled surfaces 248. In a case in which a shape of the groove differs from the trapezoidal shape shown in FIGS. 2 and 3, the attachment surfaces may vary in relative sizes and shapes. For example, the attachment surface may include curved or arcuate, curvilinear, and/or flat surfaces, as well as a greater or lesser number of planar or angled surfaces. In particular, the groove 244 may be formed as the curved attachment surface 252 of the shoe plate body 220, as shown in FIG. 4.

In addition, the method 500 may include a step 504 of forming a grouser 200 having a grouser body 204 having attachment surfaces, including a planar surface 216 and at least two angled surfaces 218 configured to fit within the groove 244 of the shoe plate body 220. Forming the grouser 200 may include rolling a material, such as a high alloy steel, hardened to the RKW C45 to RKW C55 range, for example. Of course, in a case in which a shape of the attachment surfaces of the grouser body 204 differs from the trapezoidal shape shown in FIGS. 2 and 3, the attachment surfaces may vary in relative sizes and shapes. For example, the attachment surfaces may include curved, curvilinear, and/or flat surfaces, as well as a greater or lesser number of planar or angled surfaces. In particular, the attachment surface formed on the grouser body 204 may be curved or arcuate, as shown in FIG. 4. In any embodiments with alternative shapes and/or numbers of attachment surfaces, the shapes and numbers of the attachment surfaces on the grouser body 204 correspond to the shapes and numbers, respectively, of the attachments surfaces of the groove 244 in the shoe plate body 220. In this manner, the grouser 200 may be self-aligning upon placement within the groove 244 of the shoe plate body 220.

Finally, the method 500 may include a step 506 of attaching the grouser 200 to the shoe plate 202. Specifically, step 506 may include welding or brazing the attachment surfaces of the grouser body 204 to the attachment surfaces of the shoe plate body 220, with the planar surface 218 of the grouser body 204 being welded to the planar surface 246 of the shoe plate body 220, and the angled surfaces 218 of the grouser body 204 being welded to the angled surfaces 248 of the shoe plate body 220. Welding may include one of arc welding, such as metal inert gas (MIG) arc welding, tungsten inert gas (TIG) welding, and shielded metal arc welding (SMAW), and friction welding, such as linear friction welding. The welding or brazing may be used to attach the surfaces along entire widths thereof, or welding may be used on a portion of the surfaces (that is, not the entirety of the width of the surfaces). Although some examples of particular types of welding are described above, other types of welding may be performed as part of the attaching step of the method 500. Although the method 500 is described as including steps 502 to 506, noted above, the method 500 is not limited to these steps.

And, although the method 500 includes the steps of forming the groove 244 in the shoe plate body 220, and forming the grouser body 204 to include a plurality of attachment surfaces to fit within the groove 244 of the shoe plate body 220, the method may alternatively include steps of forming a groove in the grouser body 204, and forming the shoe plate body 220 to include a plurality of attachment surfaces to fit within the groove formed in the grouser body 204.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A track shoe assembly comprising:
   a shoe plate having a shoe plate body including at least one shoe plate attachment surface defining a groove extending along a width of the shoe plate body; and
   a grouser having a grouser body having at least one grouser attachment surface, a cross-sectional shape of the at least one grouser attachment surface being the same as a cross-sectional shape of the groove defined by the at least one shoe plate attachment surface, wherein the at least one grouser attachment surface is attached to the groove in the shoe plate body by welding.

2. The track shoe assembly according to claim 1, wherein the welding used to attach the at least one grouser attachment surface to the groove in the shoe plate body is one of arc welding or friction welding.

3. The track shoe assembly according to claim 2, wherein the welding is arc welding, and includes one or more of metal inert gas (MIG) arc welding, tungsten inert gas (TIG) welding, or shielded metal arc welding (SMAW).

4. The track shoe assembly according to claim 1, wherein an entire length of the groove in the shoe plate body and an entire length of the at least one grouser attachment surface are welded together.

5. The track shoe assembly according to claim 1, wherein each of the at least one attachment surface of the shoe plate body and the at least one attachment surface of the grouser body includes a planar surface and at least two angled surfaces adjacent to the planar surface.

6. The track shoe assembly according to claim 5, wherein an edge between each planar surface and each of the two angled surfaces is a chamfered edge.

7. The track shoe assembly according to claim 5, wherein an edge between each planar surface and each of the two angled surfaces is a rounded edge.

8. The track shoe assembly according to claim 1, wherein each of the at least one attachment surface of the shoe plate body and the at least one attachment surface of the grouser body includes a curved surface.

9. The track shoe assembly according to claim 8, wherein a radius of curvature of the curved surface of the shoe plate body is approximately equal to or greater than a radius of curvature of the curved surface of the grouser body.

10. A track chain assembly comprising:
    a plurality of track links;
    a plurality of track shoe assemblies, including the track shoe assembly according to claim 1; and
    a plurality of track pins configured to attach the plurality of track links to the plurality of track shoe assemblies.

11. A track shoe assembly comprising:
    a shoe plate having a shoe plate body including at least one shoe plate attachment surface defining a groove extending along a width of the shoe plate body; and
    a grouser having a grouser body having at least one grouser attachment surface configured to be attached to the at least one shoe plate attachment surface,
    wherein a ratio of a cross-sectional area of an end surface of the grouser body to a length of the shoe plate body is in the range of 25 mm to 210 mm, and
    wherein the at least one grouser attachment surface is attached to the groove in the shoe plate body by welding.

12. The track shoe assembly according to claim 11, wherein the at least one grouser attachment surface is attached to the at least one shoe plate attachment surface by one of arc welding or friction welding.

13. The track shoe assembly according to claim 11, wherein the at least one grouser attachment surface is attached to the at least one shoe plate attachment surface by one of metal inert gas (MIG) arc welding, tungsten inert gas (TIG) welding, or shielded metal arc welding (SMAW).

14. The track shoe assembly according to claim 11, wherein the at least one grouser attachment surface is attached to the at least one shoe plate attachment surface by brazing.

15. A track chain assembly comprising:
    a plurality of track links;
    a plurality of track shoe assemblies, including the track shoe assembly according to claim 11; and
    a plurality of track pins configured to attach the plurality of track links to the plurality of track shoe assemblies.

16. A method of manufacturing a track shoe assembly, the method comprising:
    forming a shoe plate having a shoe plate body including at least one shoe plate attachment surface defining a groove extending along a width of the shoe plate body;
    forming a grouser body having at least one grouser attachment surface configured to be attached to the at least one shoe plate attachment surface, wherein a ratio of a cross-sectional area of an end surface of the grouser body to a length of the shoe plate body is in the range of 25 mm to 210 mm; and
    attaching the grouser to the shoe plate to form the track shoe assembly, wherein an entire length of the groove in the shoe plate body and an entire length of the at least one grouser attachment surface are welded together.

17. The method according to claim 16, wherein the attaching the grouser to the shoe plate to the at least one grouser attachment surface to the at least one shoe plate attachment surface by welding includes one of arc welding or friction welding.

18. The method according to claim 16, wherein the attaching the grouser to the shoe plate to the at least one grouser attachment surface to the at least one shoe plate attachment surface by welding includes one of metal inert gas (MIG) arc welding, tungsten inert gas (TIG) welding, or shielded metal arc welding (SMAW).

19. The method according to claim 16, wherein the attaching the grouser to the shoe plate includes brazing the at least one grouser attachment surface to the shoe plate attachment surface.

20. A track shoe assembly comprising:
a shoe plate having a shoe plate body including at least one shoe plate attachment surface defining a groove extending along a width of the shoe plate body, the shoe plate body being formed of a shoe plate material; and
a grouser having a grouser body having at least one grouser attachment surface, a cross-sectional shape of the at least one grouser attachment surface being the same as a cross-sectional shape of the groove, the grouser body and the at least one grouser attachment surface being formed of a grouser material, and the grouser material being different than the shoe plate material, wherein the at least one grouser attachment surface is attached to the shoe plate body.

21. The track shoe assembly according to claim 20, wherein the at least one grouser attachment surface is attached to the at least one shoe plate attachment surface by welding, including one of arc welding or friction welding.

22. The track shoe assembly according to claim 20, wherein the at least one grouser attachment surface is attached to the at least one shoe plate attachment surface by welding, including one of metal inert gas (MIG) arc welding, tungsten inert gas (TIG) welding, or shielded metal arc welding (SMAW).

23. The track shoe assembly according to claim 20, wherein the at least one grouser attachment surface is attached to the at least one shoe plate attachment surface by brazing.

24. The track shoe assembly according to claim 20, wherein a hardness of the grouser material is in the range of RKW C45 to RKW C55, and a hardness of the shoe plate material is in the range of RKW C35 to RKW C45.

25. A track chain assembly comprising:
a plurality of track links;
a plurality of track shoe assemblies, including the track shoe assembly according to claim 20; and
a plurality of track pins configured to attach the plurality of track links to the plurality of track shoe assemblies.

26. A track shoe assembly comprising:
a shoe plate having a shoe plate body including at least one shoe plate attachment surface extending along a width of the shoe plate body, the shoe plate body being formed of a shoe plate material; and
a grouser having a grouser body having at least one grouser attachment surface, configured to be attached to the at least one shoe plate attachment surface, the grouser body being formed of a grouser material that is different from the shoe plate material, wherein a hardness of the grouser material is greater than a hardness of the shoe plate material.

27. The track shoe assembly according to claim 26, wherein a hardness of the grouser material is in the range of RKW C45 to RKW C55, and a hardness of the shoe plate material is in the range of RKW C35 to RKW C45.

28. The track shoe assembly according to claim 26, wherein the at least one grouser attachment surface is attached to the at least one shoe plate attachment surface by welding, including one of arc welding or friction welding.

29. The track shoe assembly according to claim 26, wherein the at least one grouser attachment surface is attached to the at least one shoe plate attachment surface by welding, including one of metal inert gas (MIG) arc welding, tungsten inert gas (TIG) welding, or shielded metal arc welding (SMAW).

30. A track chain assembly comprising:
a plurality of track links;
a plurality of track shoe assemblies, including the track shoe assembly according to claim 26; and
a plurality of track pins, configured to attach the plurality of track links to the plurality of track shoe assemblies.

* * * * *